(12) United States Patent
Ricciardi, Sr.

(10) Patent No.: US 6,444,926 B1
(45) Date of Patent: Sep. 3, 2002

(54) ROTARY POCKETED WEIGH FEEDER

(75) Inventor: Ronald J. Ricciardi, Sr., Woodcliff Lake, NJ (US)

(73) Assignee: Acrison, Inc., Moonachie, NJ (US)

( * ) Notice: Subject to any disclaimer, the term of this patent is extended or adjusted under 35 U.S.C. 154(b) by 0 days.

(21) Appl. No.: 09/563,246

(22) Filed: May 1, 2000

(51) Int. Cl.[7] .................. G01G 11/14; G01G 13/22; G01G 13/04

(52) U.S. Cl. .................. 177/16; 177/83; 177/84; 177/121; 222/77

(58) Field of Search .................. 177/16, 60, 83, 177/84, 85, 86, 87, 119, 121, 17, 18, 19, 20, 88; 222/55, 56, 77; 141/83

(56) References Cited

U.S. PATENT DOCUMENTS

| | | | | |
|---|---|---|---|---|
| 924,570 A | * | 6/1909 | Mulloy | 177/20 |
| 1,193,193 A | | 8/1916 | Rundle | 177/88 |
| 1,841,995 A | | 1/1932 | Tryon | 177/88 |
| 2,141,296 A | * | 12/1938 | Ferguson | 177/86 |
| 2,191,711 A | | 2/1940 | Godat | 249/19 |
| 2,491,056 A | * | 12/1949 | Muskat | 177/121 |
| 2,971,740 A | | 2/1961 | Davis | 249/19 |
| 3,458,002 A | | 7/1969 | Launder | 177/83 |
| 3,539,028 A | | 11/1970 | Krolopp | 177/83 |
| 3,957,126 A | * | 5/1976 | Hobart | 177/121 |
| 4,130,171 A | | 12/1978 | Smith et al. | 177/1 |
| 4,301,510 A | | 11/1981 | Ricciardi et al. | 364/567 |
| 4,320,855 A | | 3/1982 | Ricciardi et al. | 222/56 |
| 4,531,597 A | * | 7/1985 | Focke et al. | 177/84 |
| RE32,102 E | | 4/1986 | Ricciardi et al. | 222/56 |
| 4,750,576 A | | 6/1988 | McMennamy | 177/88 |
| 5,103,401 A | * | 4/1992 | Johnson | 222/56 |
| 5,367,128 A | * | 11/1994 | Tsukasa et al. | 177/212 |
| 5,767,455 A | * | 6/1998 | Mosher | 177/121 |
| 5,848,728 A | | 12/1998 | Ricciardi et al. | 222/63 |

FOREIGN PATENT DOCUMENTS

| | | |
|---|---|---|
| EP | 0 279 353 | 8/1988 |
| GB | 1 518 972 | 7/1978 |

OTHER PUBLICATIONS

"Acrison Weigh Feeders Series 200", http://www.acrison-.com/wfdr.htm, Sep. 8, 1999 (2 pages).

"Acrison Weigh Feeders Weight–Loss–Differential Series 400", http://www.acrison.com/wldfr.htm, Sep. 8, 1999 (5 pages).

* cited by examiner

Primary Examiner—Randy W. Gibson
(74) Attorney, Agent, or Firm—Fish & Richardson PC

(57) ABSTRACT

A weigh feeding apparatus has a plurality of compartments to hold a material that is fed into the compartments and a scale for weighing the material held in the compartments. The compartments are configured to revolve about an axis at a substantially constant rate and the scale is configured to produce a signal determined by the weight of the material held in the compartments. The signal is capable of being used to control the rate at which material is fed into the compartments.

27 Claims, 7 Drawing Sheets

ROTARY POCKETED WEIGH FEEDER

BACKGROUND

The invention relates generally to material feeding systems and more particularly to dry solid feeding systems.

The precise metering of dry solids is important in many applications, including numerous manufacturing processes in various industries. Usually when material is continuously metered into a process, it must be precisely controlled at a specific feed rate so that the process functions as designed, the product formulation is correct, and the quality of the end product of the process does not suffer.

Various kinds of weigh feeders have been used for weighing and feeding dry solids such as sand, gravel, grain, foodstuffs, chemicals, pharmaceuticals, ceramics, etc. In general, material is provided to a weigh feeder continuously or periodically and the weigh feeder discharges the material at a continuous and constant output rate. Different weigh feeders, however, have different capabilities, which depend on the design of the weigh feeder and its principle of operation. Weight-loss, weigh belt, and weigh auger feeders are three types of commonly used weigh feeders.

Weigh belt feeders weigh material as the material is transported by a moving belt and require a continuous supply of material, generally from an overhead storage supply. In one functional configuration (e.g. Acrison, Inc., Model 260 Belt Weigher/Feeder), material travels from a storage supply, down a chute and onto a rear portion of the belt, which is not weighed. As the belt moves, the material on the belt passes over a weighing section, and a weight signal is produced that corresponds to the weight of material traveling across the weighing section. The weight signal is processed in conjunction with another signal, representing the speed of the belt, by the weigh feeder's controller to derive a feed rate signal. The feed rate signal is compared to the feed rate desired by the user, and the weigh feeder's controller continuously adjusts a variable speed drive powering the belt to maintain the desired feed rate.

A weigh belt feeder may also utilize a feeding mechanism to actively feed material onto the belt (e.g. a screw conveyor/feeder, another belt, a vibratory tray device, etc.). Although such active feeding (or prefeeding) is different from the method of gravimetric feeding described above, the material on the belt is weighed in an identical manner. Such active feeding of material onto the weigh belt generally provides a greater degree of physical control over the material being fed. In this mode of operation, the weigh belt moves at a fixed constant speed, and the feed rate of the feeding mechanism is variable. Thus, the weigh feeder's controller continuously modulates the output of the feeding mechanism that feeds material onto the belt to maintain a selected feed rate of material off the belt. Material is usually provided to the feeding mechanism directly from a storage supply, for example, a hopper or silo.

A different type of weigh belt feeder (e.g. Acrison, Inc., Models 203/210) operates by weighing the entire weigh belt assembly, while a pre-feeder (e.g. a screw conveyor/feeder, another belt, or a vibratory type device) meters material onto the weigh belt, which operates at a fixed constant speed. The output of the pre-feeder, which is equipped with a variable speed output drive, is continuously modulated by the weigh feeder's controller so that the rate at which material passes across the weigh belt accurately matches the selected feed rate. In such a weigh feeder, material is also usually supplied to the pre-feeder directly from a storage supply.

A weigh auger feeder (e.g. Acrison, Inc., Model 203B) operates in a manner similar to the weigh belt described immediately above, except that an auger, rather than a belt, is used to weigh and convey the material.

A weight-loss feeder (e.g. Acrison, Inc. Model 400 Series) comprises a material supply hopper and a feeding mechanism mounted on a scale. As material is fed out of the scale-mounted metering/supply system, a decreasing weight signal is produced, which is processed by the weigh feeder's controller in conjunction with a time signal to calculate a feed rate. The feeding mechanism of a weight-loss weigh feeder is equipped with a variable speed drive so that its feed rate output can be continuously modulated by the weigh feeder's controller in order to maintain the selected feed rate. The supply hopper of a weight-loss weigh feeder can be periodically refilled.

SUMMARY OF THE INVENTION

In a first aspect, the invention features a weigh feeding apparatus having a plurality of compartments to hold a material that is fed into the compartments and a scale for weighing the material held in the compartments. The compartments are configured to revolve about an axis at a substantially constant rate and the scale is configured to produce a signal determined by the weight of the material held in the compartments. The signal is capable of being used to control the rate at which material is fed into the compartments.

Implementations of the invention may include one or more of the following. The compartments may include at least two vanes that radiate from an axle. The compartments may be configured to move from a first position to a second position, where the compartments are capable of receiving material fed into the compartments when the compartments are in the first position and are capable of discharging material when the compartments are in the second position. The signal may be capable of being used to control the rate which material is material is fed into the compartments, such that the weight of the material in the plurality of compartments is held substantially constant as the material is discharged from the compartments in the second position. The compartments may be configured to discharge material at a substantially constant discharge rate.

In an additional implementation, the invention may include a pre-feeder to feed material into the compartments, where the pre-feeder is capable of receiving the signal from the scale. The pre-feeder may be configured to feed material into the compartments at a rate determined by the signal from the scale. The compartments of the rotatable compartmented mechanism may be configured to move from a first position to a second position, and the compartments may be capable of receiving material fed into the compartments from the pre-feeder when the compartments are in the first position and may be capable of discharging material when the compartments are in the second position. The signal may be capable of being used to control the feed rate of the pre-feeder, such that the weight of the material in the plurality of compartments is held substantially constant as the material is discharged from compartments in the second position while the material is discharged from the rotatable compartmented mechanism at a substantially constant discharge rate.

In a second aspect, the invention features a method for providing a material at a substantially constant rate by feeding the material from a pre-feeder into a plurality of compartments for holding the material, as the compartments revolve about an axis at a substantially constant speed; weighing the material held in the plurality of compartments;

providing a signal determined by the weight of the material held in the plurality of compartments; and using the signal to adjust the feed rate of the pre-feeder.

Implementations of the invention may include one or more of the following. The signal may be an electrical, mechanical, or optical signal. The material may be a solid or a liquid. The compartments may include at least two vanes that radiate from an axle and at least two endplates. As the compartments revolve, each of the compartments may move from a first position to a second position, and material may be fed into each of the compartments when the compartment is in the first position and may be discharged from each of the compartments when the compartments are in the second position. The rate at which the feeder feeds the material into the compartments may be adjusted, such that the weight of the material in the plurality of compartments is held substantially constant as the compartments revolve.

DESCRIPTION

Figure 1A:
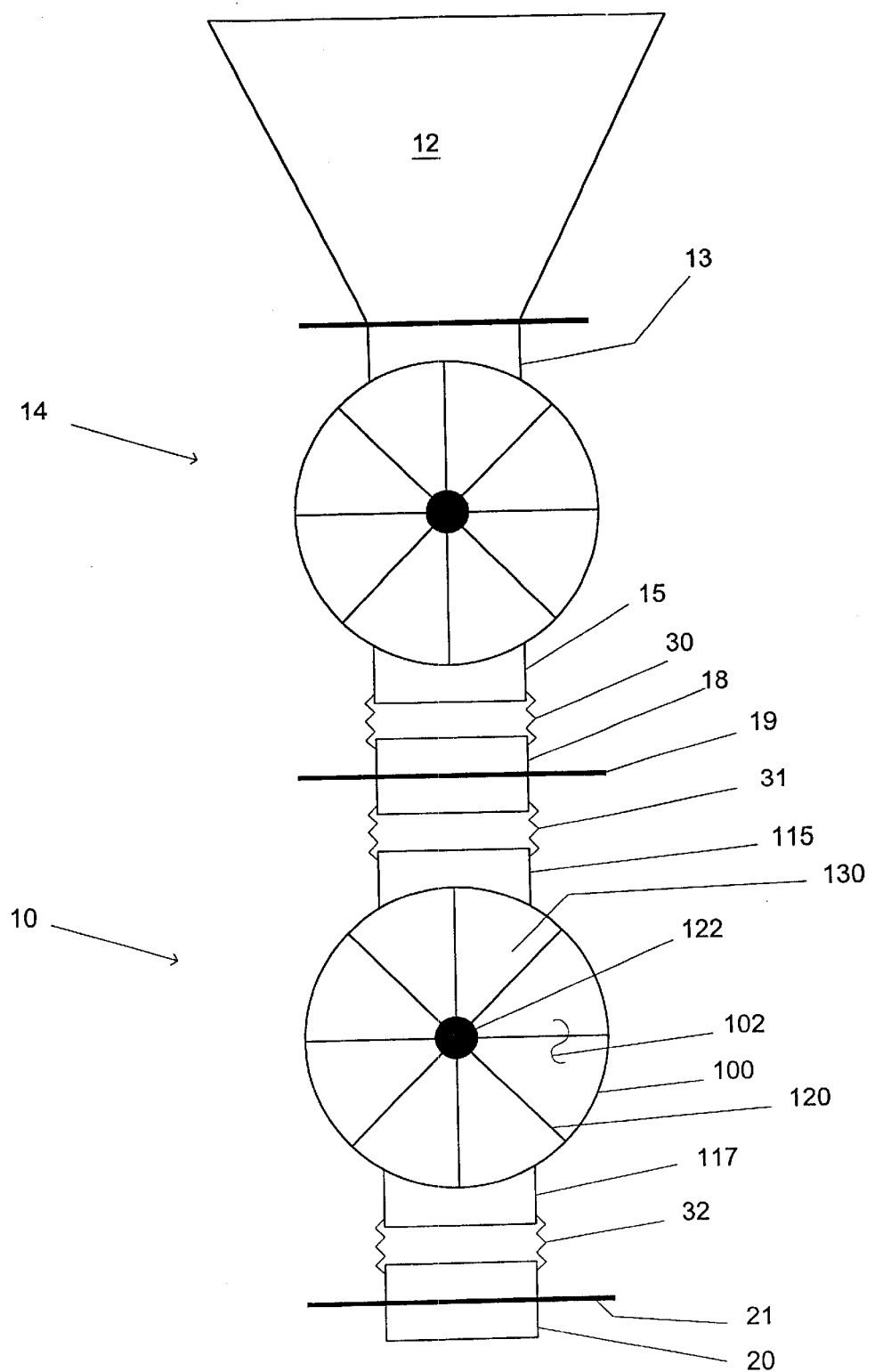
FIG. 1a and FIG. 1b are schematic side elevations of a weigh feeder.
Figure 1B:
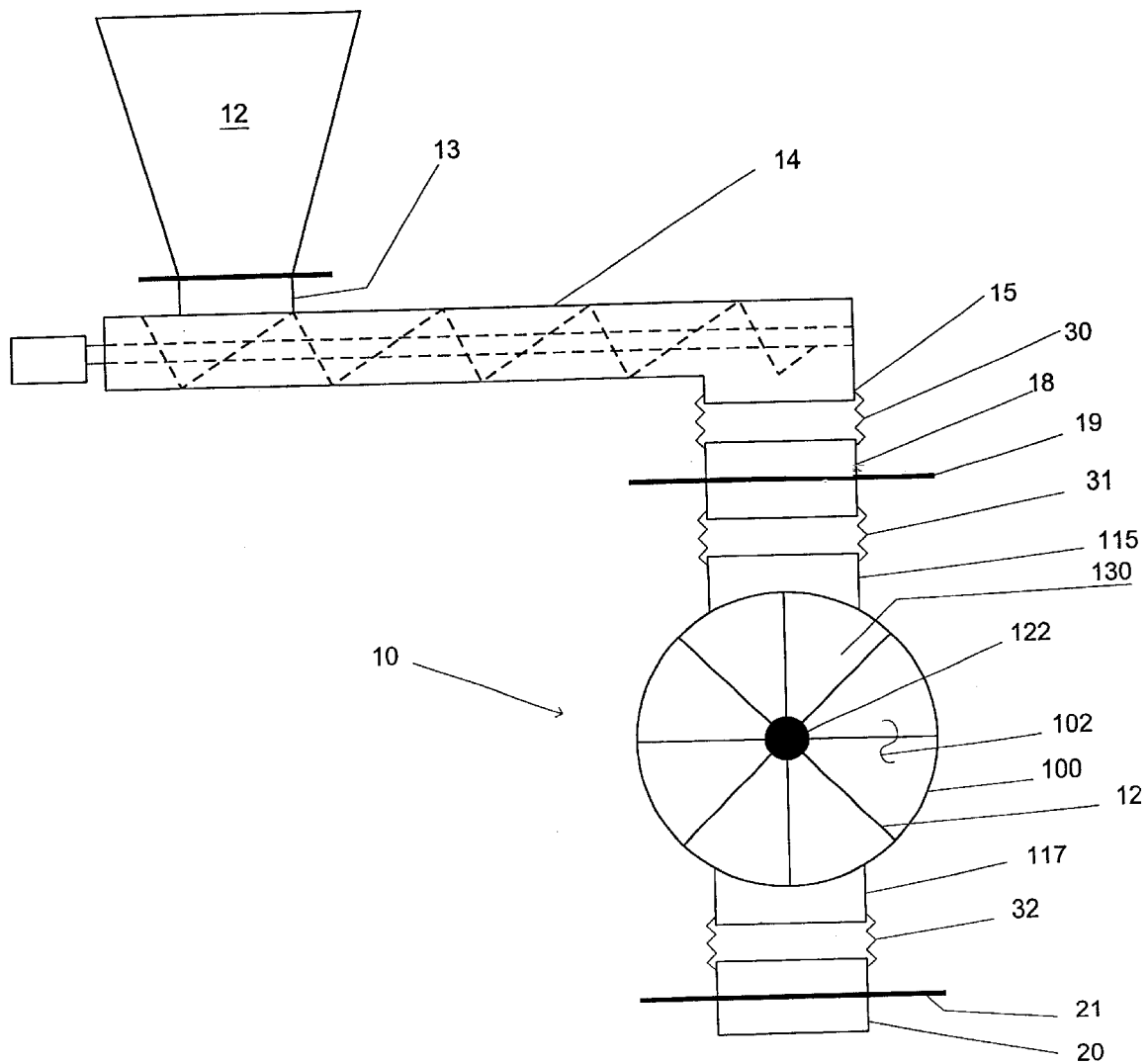

FIG. 1a schematically illustrates a weigh feeder 10, including a weighing chamber 100 housing a rotatable compartmented mechanism 102. Weigh feeder may be operably connected to a pre-feeder 14 and a supply hopper 12. The supply hopper 12 contains material to be fed and is mechanically connected at an inlet port 13 of pre-feeder 14. Pre-feeder 14 is equipped with a variable speed drive in order to feed material into weigh feeder 10 at a controlled rate, based on signals from the weigh feeder. FIG. 1a shows a rotary vane type pre-feeder 14 and FIG. 1b shows an auger type pre-feeder 14, both of which may move material into weigh feeder 10 at a controllable rate. The invention may also be practiced in combination with other pre-feeders that move material into weigh feeder at a controllable rate.

Supply hopper 12 may have a conical profile to facilitate gravitational discharge of material into the pre-feeder 14. Material also may be actively moved by an active mechanical mechanism, to ensure positive flow of material out of supply hopper 12, through inlet port 13 and into pre-feeder 14.

A discharge port 15 of pre-feeder 14 is coupled to one end of a separately supported isolation inlet port 18 of weigh feeder 10 with a connector 30 that may be flexible or rigid (a flexible connector is shown). Isolation inlet port 18 is supported by a flange 19 so that it is mechanically isolated from weigh feeder 10. The opposite end of inlet port 18 is coupled to the inlet 115 of weighing chamber 100 with a flexible connector 31 that may be a dust-tight flexible sleeve. The sleeve may be made of cloth, rubber, a combination of both cloth and rubber, or some other type of material that allows a flexible dust-tight mechanical connection, yet which mechanically isolates inlet port 18 from weigh feeder 10. A similar flexible connector 32 couples the outlet 117 of weighing chamber 100 to an isolation outlet port 20, which is separately supported by a flange 21 to mechanically isolate outlet port 20 from weigh feeder 10. Isolation inlet port 18 and isolation outlet port 20 may be included with weighing chamber 100, so that a user of weigh feeder 10 need not make connections directly to the inlet 115 and outlet 117 of the scale-mounted weighing chamber 100. It preferable for the user to make connections to ports that are mechanically isolated from the weigh feeder so that the sensitivity of the scale mounted weighing chamber 100 is not disturbed.

Pre-feeder 14 feeds material through isolation inlet port 18 to the weighing chamber 100, which houses a rotatable compartmented mechanism 102. The rotatable compartmented mechanism 102 comprises a series of compartments 130, defined by vanes 120 that revolve about an axle 122 on the central axis of weighing chamber 100. The entire chamber is mounted on a precision scale 20 (not shown) and counterbalanced so that only the material actually fed into weighing chamber 100 by pre-feeder 14 is weighed. A signal directly related to the weight of the material in weighing chamber 100 provides feedback to control the output rate of material from the weigh feeder 10 in a way described below. First, however, weighing chamber 100 is described.

Figure 2A:
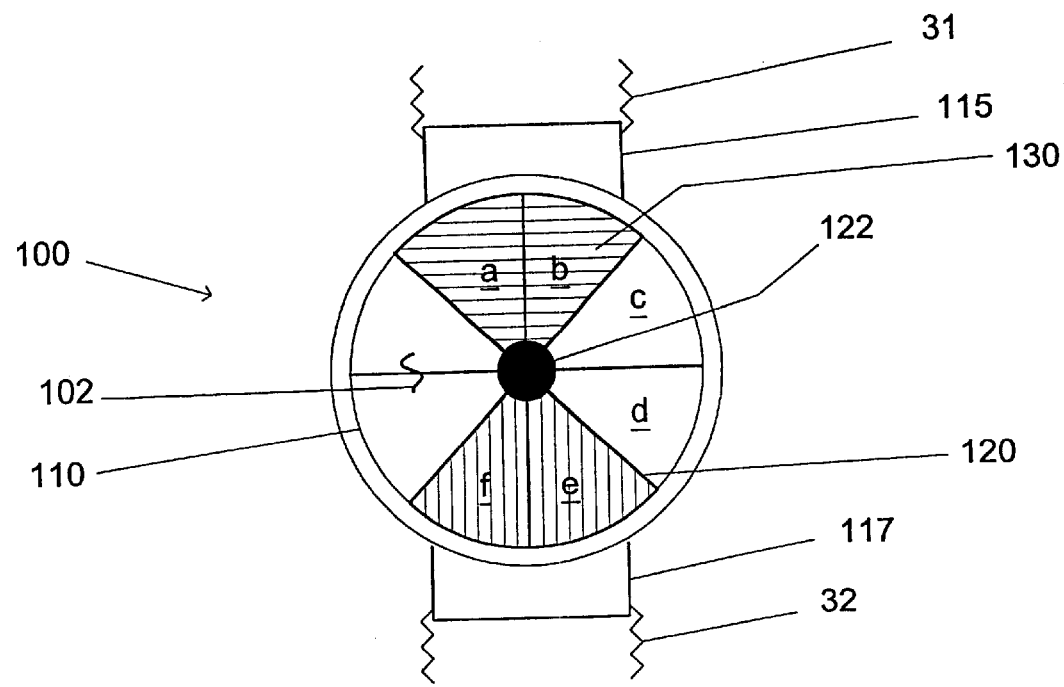
FIG. 2a and FIG. 2b are schematic side elevations of a weigh feeder.
Figure 2B:
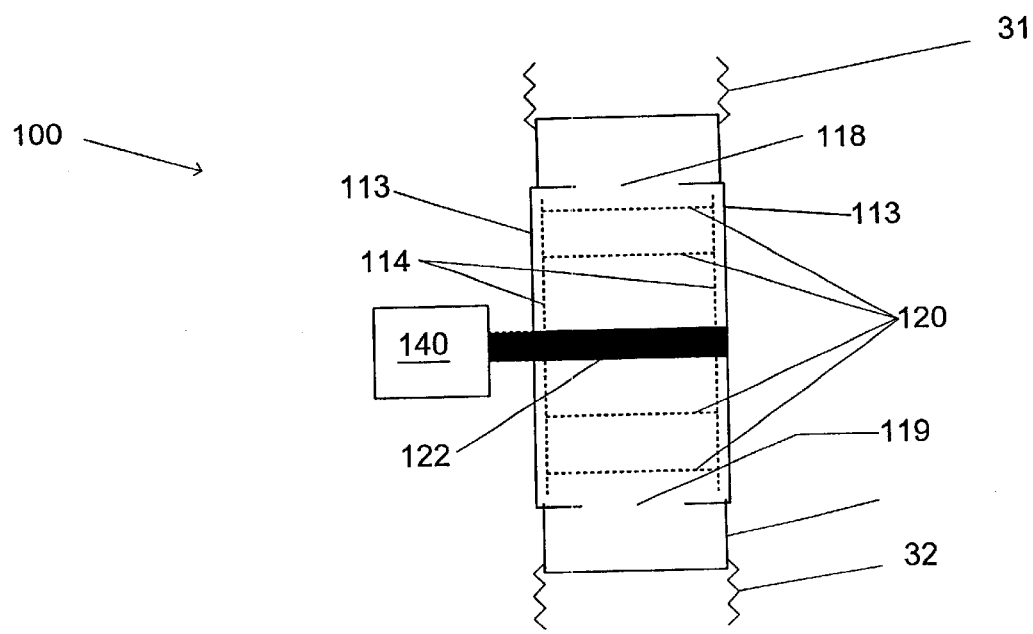

Referring to FIGS. 2a and 2b, an end view (FIG. 2a) and a side view (FIG. 2b) of the weighing chamber 100 are illustrated. Weighing chamber 100 is formed from generally cylindrical sidewalls 110 and flat endwalls 113. An entrance opening 118 and an exit opening 119 exist in weighing chamber 100 for material to enter and exit. Inside weighing chamber 100, multiple vanes 120 extend out from a central axle 122. Two flat disk-shaped endplates 114 are attached to axle 122 and are connected to the longitudinal ends of multiple vanes 120, forming multiple approximately pie-wedge-shaped compartments 130 of the weighing chamber. The invention may also be practiced without endplates 114, in which case the longitudinal ends of vanes 120 extend close to, but do not touch, flat endwalls 113. When endplates are not used, compartments 130 are formed by central axle 122, vanes 120, and flat endwalls 113.

The invention may be practiced using two or more compartments, but generally 6–20 compartments are used. Because of the finite diameter of the axle 122, the compartments 130 are not exactly pie-wedge-shaped because the vanes 120 do not touch each other where they contact the axle 122. Rather, the vanes 120 meet the axle at different azimuthal positions around the axle, and therefore the shape of the compartments is more precisely described as pie-wedge-shaped portion minus a portion of the tip of the wedge.

The clearance between the outer ends of the vanes 120 and the inside wall 110 of weighing chamber 100 is small, such that only insignificant amounts of material, if any material at all, can pass between the radial ends of vanes 120 and cylindrical sidewall 110. If endplates 114 are not used to form compartments 130, the clearance between the longitudinal ends of vanes 120 and end flatwalls 113 is similarly small. The exact dimension of the clearance depends on the type of material fed into the weigh feeder 10, its particle size, and the temperature of the weigh feeder. Typically, a smaller clearance is required if fine powder is used in weigh feeder 10 than if large grains are used in it. The radial and/or longitudinal ends of the vanes 120 may be fitted with a flexible material, such as a rubber wiper, that makes contact with the cylindrical sidewall 110 and/or flat endwalls 113, so that there is nominally no gap between revolving vanes 120 and inside wall 110 and or flat endwalls 113 of the weighing chamber 100. Material cannot leak past the ends of vanes 120 either because of the small clearance between the ends of vanes 120 and endwalls 113 or because the flat disk-shaped plates 114 may form the ends of, and rotate with, compartments 130.

Central axle 122 is coupled to a synchronous drive gearmotor 140, located outside the weighing chamber 100, either directly, through a coupling, or with a chain. Drive gearmotor 140 turns the central axle 122 and the vanes 120 of the rotatable compartmented mechanism 102. As vanes 120 revolve around the axle 122, the compartments 130 defined by the vanes also revolve around the central axis 122 of weighing chamber 100. Axle 122 rotates at a constant speed, driven by synchronous drive gearmotor 140. Generally, the rotation speed of axle 122 and rotatable compartmented mechanism 102 is approximately 3–30 rotations per minute (RPM) and is determined based on application parameters. Once this speed has been set, however, it generally remains constant for a given application.

Further referring to FIG. 2, while rotatable compartmented mechanism 102 rotates within weighing chamber 100, material is fed through entrance opening 118 into compartments 130 from pre-feeder 14 (not shown) located directly above weighing chamber 100. Material falls into a compartment 130 when compartment 130 is in a first position (horizontal striped shaded area in FIG. 2a), located in the upper part of mechanism 102 and revolves within the compartment 130 until the compartment 130 is in a second position (vertical striped shaded area in FIG. 2a), in the lower portion of the mechanism 102. In the second position, the material in the compartment 130 passes over exit opening 119 of weighing chamber 100, where the material is discharged from weighing chamber 100 by the force of gravity. For example, as rotatable compartmented mechanism 102 rotates, material may fall from pre-feeder 14 (not shown) through input 115 and be deposited in compartments 130 in positions a and/or b, located under inlet 115. As rotatable compartmented mechanism 102 rotates, the deposited material is moved with the compartments as they revolve around axle 122 until the compartments reach positions e and f, at which point the material falls out the compartments and weighing chamber 100 through outlet 117 under the force of gravity. Compartments 130 generally are filled from 5 percent to 80 percent of their volume capacity when the weigh feeder is operating. Operation at less than 100 percent capacity is generally necessary when feeding dry materials into weigh feeder due to their tendency to "pile-up," rather than spread out to fill all available capacity of a compartment.

Figure 3:
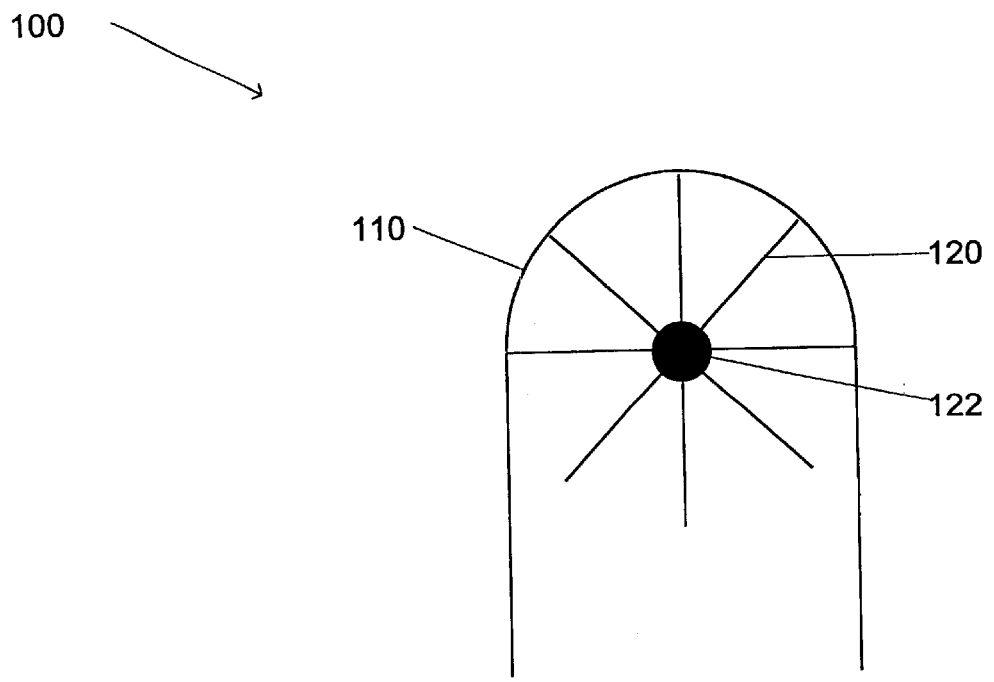
FIG. 3 is a schematic side elevation of a rotary vane weighing apparatus of a weigh feeder.

Referring to FIG. 3, the profile of weighing chamber 100 may be constructed such that in the bottom portion of its body, the distance from axle 122 to sidewall 110 is significantly greater than the length of the vanes 120, so that the vanes 120 do not confine material when the material reaches this larger portion of the body.

Because compartments 130 of the rotatable compartmented mechanism 102 revolve at a constant rate, if material is fed into weighing chamber 100 at a constant rate, it also falls out of weighing chamber 100 at a constant rate.

Because of the closed configuration of weighing chamber 100, weigh feeder 10 is substantially dust-tight, unlike weigh belt feeders in which a large portion of the functional mechanism is exposed to dust accumulation. Additionally, because weighing chamber 100 has relatively few moving parts, weigh feeder 10 is mechanically relatively simple.

Figure 4:
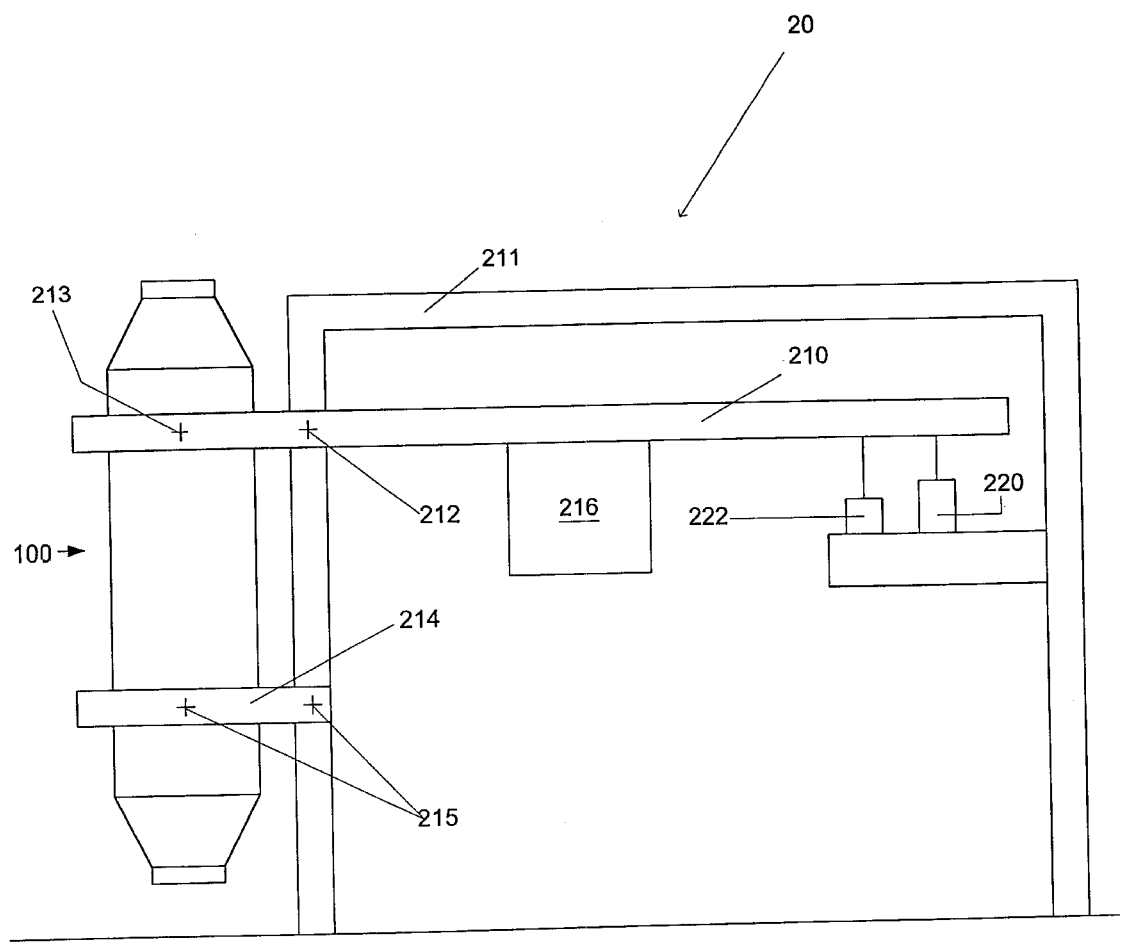
FIG. 4 is a schematic side elevation of a scale.

Referring to FIGS. 2a, 2b, and 4, the entire weighing chamber 100, and all components thereof, including drive gearmotor 140 and the material contained within weighing chamber 100, are weighed by scale 20, which may be a beam balance type weighing mechanism. Weighing chamber 100 is suspended by a principal lever beam 210, which may split into a Y-shaped yoke to hold weighing chamber 100 at its two ends. Principal lever beam 210 is attached to a main support structure 211 with primary flextures 212 and to a structure supporting the weighing chamber 100 with secondary flextures 213. A stabilizer linkage assembly 214 connects the lower portion of the structure supporting weighing chamber 100 to main support structure 211. Stabilizer linkage assembly 214 is attached to the main support structure and to the structure supporting the weighing chamber 100 with linkage flextures 215.

Principal lever beam 210 pivots about primary flextures 212. Without any material in weighing chamber 100, scale 20 is in equilibrium at its "null" position. This is known as the scale's "zero point," which provides a reference for feed rate calibration. As material is added into weighing chamber 100, lever beams 210 pivots slightly about primary flextures 212 in response to the weight of the material. A sensor 220 measures the displacement of principal lever beam 210. The sensor may be a mechanical, electromechanical, strain gauge, piezo-electric, LVDT, a displacement measurement, or similar transducer of some type. Because the measured displacement is directly proportional to the weight of the material in the weighing chamber 100, the sensor 220 provides a precise signal directly and linearly related to the weight of the material in the weighing chamber 100.

Principal lever beam 210 is also equipped with one or more dashpots 222 to dampen motion of the lever arms due to sudden deviations from equilibrium in the weighing system, typically produced by vibration or by the manner in which material enters the weighing chamber 100. Although a beam balance type lever mechanism scale is described above as the scale used in the invention, it is understood that the invention may also be practiced using other types of scales equipped with other types of weight sensors.

Figure 5:
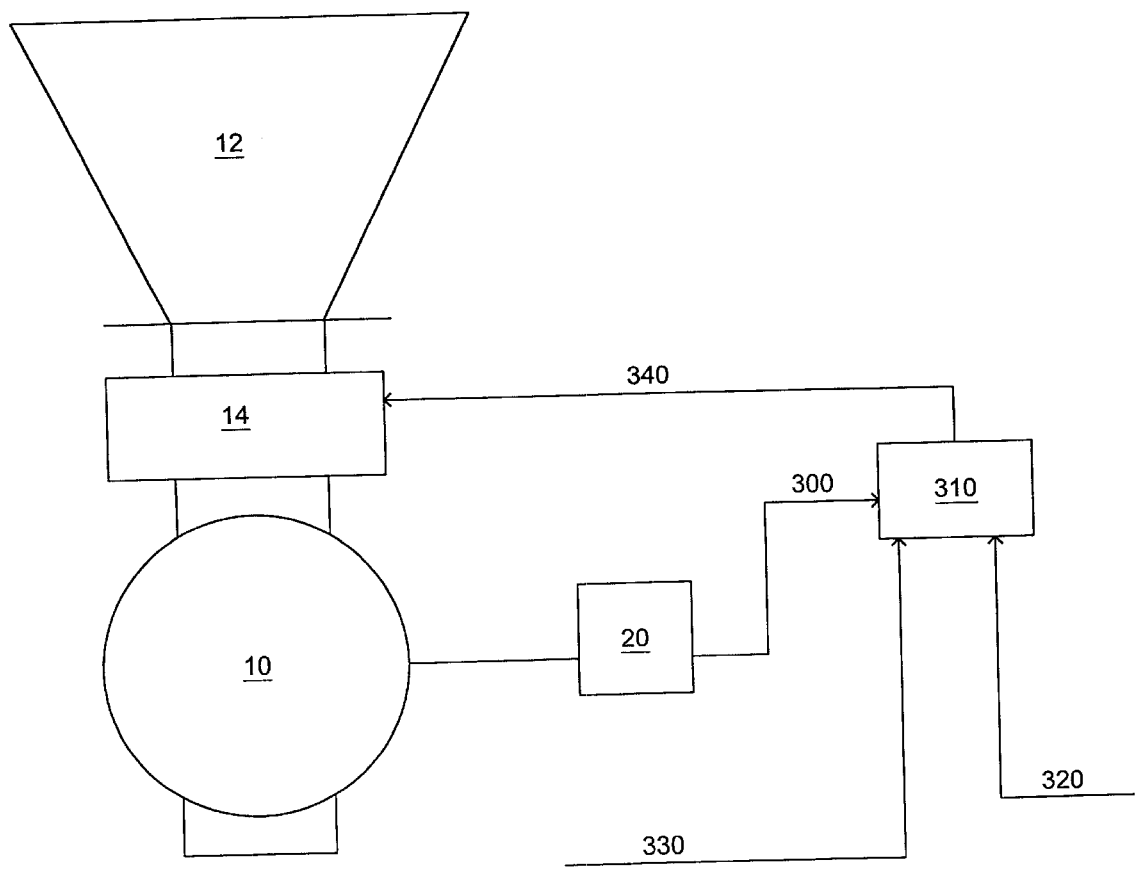
FIG. 5 is a schematic diagram of a feedback system.

Referring to FIG. 5, a weight signal 300 generated by scale 20 and proportional to the weight of material in weigh feeder 10 is used in a comparator 310 to compare the actual output rate of material from weigh feeder 10 to the desired output rate of material from weight feeder 10. Comparator 310 is generally a computer, but mechanical, electrical, or other comparators may also be used to practice the invention.

A user determines the desired output rate, and the user, in effect, sets the value of a signal 320 related to the desired output rate, which is fed into comparator 310. A signal 330 related to the rotation rate of rotatable compartmented mechanism 102 is also fed into comparator 310. Combined with weight signal 300, signal 330 permits a calculation of the actual output rate of material from the weigh feeder 10. Since signal 300 is related to the weight of material in weighing chamber 100, and signal 330 is related to the rate at which material is discharged from weighing chamber 100, a simple mathematical algorithm, in which signals 300 and 310 are parameters, gives a signal related to the actual output rate of material from weigh feeder 10.

The signal related to the actual output rate is compared in comparator 310 to the signal 320 related to the desired output rate. If the actual output rate is lower than the desired output rate, a feedback signal 340 is sent from comparator 310 to pre-feeder 14 instructing it to feed material into weigh feeder 10 at a faster rate. If the actual output rate is higher than the desired output rate, a feedback signal 340 is sent from comparator 310 to pre-feeder 14 instructing it to feed material into weigh feeder 10 at a slower rate. Feedback signal 340 ensures that the actual output rate of material from weigh feeder 10 is equal to the desired output feed rate.

The accuracy of the signal corresponding to the actual output rate depends not only on the accuracy of the weight and rotation rate measurements, but also on the validity of the assumption that all the material that enters weighing chamber 100 exits the chamber. If all the material that enters weighing chamber 100 exits it, then the laden weight of the weighing chamber minus the unladen weight is equal to the weight of material that is moved through the weighing chamber in a certain amount of time.

If, however, some material adheres to weighing chamber 100 or to any components of it, then somewhat less material moves through weigh feeder in the same amount of time. Feedback signal 330 effectively operates to maintain a certain weight of material in weighing chamber 100, and if material sticks to weighing chamber 100 rather than discharging from it, then the actual output rate from weigh feeder 10 will be less than the desired output rate. This is because the material adhering to internal surfaces of weighing chamber 100 causes an upward shift in the "zero point" of the weighing system, causing a lesser amount of material to be fed. Weigh feeder 10 is optimized for dry non-sticky types of materials that easily pass though the weighing chamber 100 and its rotatable compartmented mechanism 102 without adhesion.

Vanes 120, endplates 114, sidewalls 110, and central axle 122 that form compartmented weighing mechanism 102 may be made of any durable, non-reactive material. Stainless steel is a material that meets these requirements. The materials of which weighing chamber 100 and its rotatable compartmented mechanism 102 are made may be provided with a material "release" type coating, such as a Teflon® coating, to assist in preventing material adhesion as well as promoting its release if it begins to adhere. Additionally, if some material does stick to components of weighing chamber 100, signal 300 from scale 20 may be "re-zeroed" in comparator 310 to account for the material that adheres to surfaces of weighing chamber 100. Re-zeroing signal 300 effectively relates it again only to the weight of material that passes through weighing chamber 100 and weigh feeder 10.

What is claimed is:

1. A weigh feeding apparatus comprising:
    a plurality of compartments for holding a material that is fed into the compartments, the compartments being configured to revolve continuously about a horizontal axis at a substantially constant rate;
    an inlet, oriented substantially vertically, and positioned in spaced relation above the horizontal axis of the compartments;
    a drive mechanism for rotating the compartments; and
    a scale for weighing the material held in the compartments, the scale being configured to produce a signal determined by the weight of the material held in the compartments, and the signal being capable of being used to control the rate at which material is fed into the compartments;
    wherein the compartments are positioned to receive the material flowing toward the compartments from above through the inlet.

2. The apparatus of claim 1, further including a material that is a solid material.

3. The apparatus of claim 1, further including a material that is a liquid material.

4. The apparatus of claim 1, wherein the compartments comprise:
    at least two vanes that radiate from an axle; and
    at least two end barriers.

5. The apparatus of claim 1, wherein the compartments are configured to move from a first position to a second position, the compartments being capable of receiving material fed into the compartments when the compartments are in the first position and being capable of discharging material when the compartments are in the second position.

6. The apparatus of claim 5, wherein the signal is capable of being used to control the rate at which material is fed into the compartments, such that the weight of the material in the plurality of compartments is held substantially constant as the material is discharged from the compartments in the second position.

7. The apparatus of claim 5, further comprising an outlet, oriented substantially vertically and positioned in spaced relation below the horizontal axis of the compartments, and wherein the compartments are positioned to discharge the material through the outlet.

8. The apparatus of claim 5, wherein the compartments are configured to discharge material at a substantially constant discharge rate.

9. The apparatus of claim 1, further comprising a pre-feeder to feed material into the compartments, the pre-feeder being capable of receiving the signal from the scale.

10. The apparatus of claim 9, wherein the pre-feeder is configured to feed material into the compartments at a rate determined by the signal from the scale.

11. The apparatus of claim 9, further including a material that is a solid material.

12. The apparatus of claim 9, further including a material that is a liquid material.

13. The apparatus of claim 9, wherein the compartments comprise:
    at least two vanes that radiate from an axle; and
    at least two end barriers.

14. The apparatus of claim 9, wherein the compartments of the rotatable compartmented mechanism are configured to move from a first position to a second position, the compartments being capable of receiving material fed into the compartments from the pre-feeder when the compartments are in the first position and being capable of discharging material when the compartments are in the second position.

15. The apparatus of claim 14, wherein the signal is capable of being used to control the feed rate of the pre-feeder, such that the weight of the material in the plurality of compartments is held substantially constant as the material is discharged from compartments in the second position.

16. The apparatus of claim 14, further comprising an outlet, oriented substantially vertically and positioned in spaced relation below the horizontal axis of the compartments, and wherein the compartments are positioned to discharge the material through the outlet.

17. The apparatus of claim 14, wherein the material is discharged from the rotatable compartmented mechanism at a substantially constant discharge rate.

18. A method for providing a material at a substantially constant rate, comprising:
    causing a plurality of compartments arranged about a common horizontal axis to revolve continuously around the axis at a constant rate of speed;
    feeding the material from a pre-feeder at a pre-feed rate downward into the plurality of compartments wherein the compartments are configured such that they are capable of receiving the material flowing toward the compartments from above through an inlet which is oriented substantially vertically and positioned in spaced relation above the horizontal axis of the compartments;

weighing the material held in the plurality of compartments;

providing a signal determined by the weight of the material held in the plurality of compartments; and using the signal to adjust the pre-feed rate.

19. The method of claim 18, wherein the signal is an electrical signal.

20. The method of claim 18, wherein the signal is a mechanical signal.

21. The method of claim 18, wherein the signal is an optical signal.

22. The method of claim 18, wherein the material is a solid material.

23. The method of claim 18, wherein the material is a liquid.

24. The method of claim 18, wherein the compartments comprise:

at least two vanes that radiate from an axle; and at least two end barriers.

25. The method of claim 18, wherein, as the plurality of compartments revolve about the axis, each of the compartments moves from a first position to a second position, material being fed into each of the compartments when each of the compartments is in the first position and being discharged from each of the compartments when each of the compartments is in the second position.

26. The method of claim 25, further comprising adjusting the rate at which material is fed into the plurality of compartments such that the weight of the material in the plurality of compartments is held substantially constant as the compartments revolve.

27. The method of claim 25, wherein the material is discharged from the compartments from below through an outlet which is oriented substantially vertically and positioned in spaced relation below the horizontal axis of the compartments.

* * * * *